United States Patent
Marsden et al.

(10) Patent No.: US 7,666,371 B2
(45) Date of Patent: *Feb. 23, 2010

(54) METHOD FOR RECOVERING METAL VALUES FROM METAL-CONTAINING MATERIALS USING HIGH TEMPERATURE PRESSURE LEACHING

(75) Inventors: John O Marsden, Phoenix, AZ (US); Robert E Brewer, Safford, AZ (US); Joanna M Robertson, Thatcher, AZ (US); Wayne W Hazen, Lakewood, CO (US); Philip Thompson, West Valley City, UT (US); David R Baughman, Golden, CO (US)

(73) Assignee: Freeport-McMoran Corporation, Phoenix, AZ (US)

( * ) Notice: Subject to any disclaimer, the term of this patent is extended or adjusted under 35 U.S.C. 154(b) by 81 days.

This patent is subject to a terminal disclaimer.

(21) Appl. No.: 11/952,726

(22) Filed: Dec. 7, 2007

(65) Prior Publication Data

US 2008/0156656 A1  Jul. 3, 2008

Related U.S. Application Data

(60) Division of application No. 10/758,755, filed on Jan. 16, 2004, now Pat. No. 7,473,413, which is a continuation of application No. 09/912,922, filed on Jul. 25, 2001, now Pat. No. 6,680,034.

(60) Provisional application No. 60/220,622, filed on Jul. 25, 2000.

(51) Int. Cl.
*C01G 3/00* (2006.01)

(52) U.S. Cl. .................. 423/24; 423/26; 423/27; 205/580; 205/581

(58) Field of Classification Search ............. 423/24, 423/26, 27, 8, 22, 49, 54, 109, 139, 21.5; 205/580, 581, 589, 590, 604, 605, 564, 568
See application file for complete search history.

(56) References Cited

U.S. PATENT DOCUMENTS 5,698,170 A * 12/1997 King .................. 423/24
5,895,633 A *  4/1999 King .................. 423/24

* cited by examiner

*Primary Examiner*—Steven Bos
(74) *Attorney, Agent, or Firm*—Snell & Wilmer L.L.P.

(57) ABSTRACT

The present invention relates generally to a process for recovering copper and other metal values from metal-containing materials through pressure leaching operations. In accordance with the various aspects of the present invention, metal-containing pregnant leach solutions from pressure leaching operations need not be significantly diluted to facilitate effective metal recovery using solvent extraction and electrowinning.

4 Claims, 3 Drawing Sheets

METHOD FOR RECOVERING METAL VALUES FROM METAL-CONTAINING MATERIALS USING HIGH TEMPERATURE PRESSURE LEACHING

CROSS-REFERENCE TO RELATED APPLICATIONS

This application is a divisional application of U.S. patent application Ser. No. 10/758,755 entitled "Method for Recovering Metal Values from Metal-Containing Materials Using High Temperature Pressure Leaching" filed on Jan. 16, 2004 which is a continuation application of U.S. patent application Ser. No. 09/912,922, entitled "Method for Recovering Metal Values from Metal-Containing Materials Using High Temperature Pressure Leaching," filed Jul. 25, 2001, now U.S. Pat. No. 6,680,034, which claims priority to U.S. Provisional Patent Application Ser. No. 60/220,622 entitled "Methods for Recovering Copper and Other Metal. Values from Copper Sulfide Concentrate Using High Temperature Pressure Oxidation" filed on Jul. 25, 2000, all of which are incorporated by reference herein.

FIELD OF INVENTION

The present invention relates generally to a process for recovering copper and other metal values from metal-containing materials, and more specifically, to a process for recovering copper and other metal values from metal-containing materials using high temperature pressure leaching processes.

BACKGROUND OF THE INVENTION

Smelting is one approach for recovering a metal, such as copper, from a metal-bearing sulfide material. However, due to the high cost of smelting, the copper sulfide minerals in an ore body typically are first concentrated by flotation techniques to provide a smaller volume for smelting. The concentrate is then shipped to a smelter, which processes the concentrate pyrometallurgically at high temperatures to form a crude copper product that is subsequently refined to a highly pure metal.

The recovery of copper from copper sulfide concentrates using pressure leaching has proven to be a potentially economically attractive alternative to smelting. Pressure leaching operations generally produce less fugitive emissions than smelting operations, and thus, environmental benefits may be realized. Further, pressure leaching circuits may be more cost-effectively constructed on-site at a concentrator, eliminating the expense associated with concentrate transportation that smelting operations may require. Further, any by-product acid produced in the pressure leaching circuit may be able to be used in adjacent heap leaching operations, thus offsetting some of the costs associated with purchased acid.

The mechanism by which pressure leaching processes effectuate the release of copper from sulfide mineral matrices, such as chalcopyrite, is generally dependent on temperature, oxygen availability, and process chemistry. In high temperature pressure leaching processes, that is, pressure leaching processes operating above about 215° C., the dominant oxidation reaction is believed to be as follows:

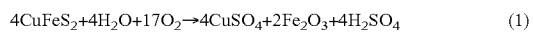
(1)

If insufficient oxygen is present in the process vessel, the conversion of iron to hematite ($Fe_2O_3$) generally will be incomplete, resulting in the formation of ferrous sulfate, an undesirable reaction by-product.

In high temperature pressure leaching, the sulfur contained in the metal-bearing material (e.g., concentrate) typically is converted to sulfate. In connection with such pressure leaching processing operations, the copper typically is recovered from the resulting solution by solvent extraction and electrowinning techniques to provide a cathode copper product of high purity.

In solvent extraction (or solution extraction or liquid ion exchange, as it is sometimes called), the pregnant leach solution typically is mixed with an organic solvent (i.e., an extractant), which selectively removes the copper from the pregnant leach solution. The copper-loaded extractant is then mixed with an aqueous acid solution, which strips the copper from the extractant, producing a solution stream suitable for electrowinning. This resultant solution stream is highly concentrated in copper and relatively pure, and typically is processed into high quality cathode copper in an electrowinning circuit.

In general, electrowinning of copper consists of the electrolytic deposition (sometimes called "plating") of copper onto a cathode and the evolution of oxygen at an anode. In a simple design of an exemplary electrowinning unit, a set of cathodes and anodes are set in a reaction chamber containing the copper-containing electrolyte. When the unit is energized, copper ions are reduced onto the cathode (i.e., plated). Plating of copper typically occurs on copper starter sheets or stainless steel blanks. Anodes are quasi-inert in the electrolyte and provide a surface for oxygen evolution. The copper plates produced by the electrowinning unit can be in excess of 99.99 percent pure.

Purification of copper from the pregnant leach solution by solvent extraction has proven to be a successful means of providing a concentrated copper solution suitable for electrowinning of highly pure copper metal. However, prior art teachings suggest the importance of ensuring that the acid concentration of the pregnant leach solution is appropriately controlled, often through neutralization, such as through the use of lime or acid-consuming ore.

Still others have recognized that the use of lime to neutralize the acid in the solution not only increases operating costs due to lime consumption but also may result in the formation of a low pulp density slurry, thus tending to make it more difficult to recover the copper from that slurry. In response, Placer Dome, Inc., of Vancouver, British Columbia, Canada, has proposed in, for example, U.S. Pat. Nos. 5,698,170 and 5,895,633 methods to recover copper from copper-containing materials, especially copper from copper sulfides such as chalcopyrite, wherein a copper-containing solution containing an acid is contacted, that is, diluted, with an aqueous diluent containing no more than about 5 grams/liter acid to yield a diluted copper-containing solution having an acid concentration ranging from about 2 to about 8 grams/liter prior to the step of solvent extracting the copper from the diluted copper-containing solution. In their patents, Placer Dome requires the significant use of a diluting solution to lower acid levels in the copper-containing solution sufficiently for favorable equilibrium conditions during solvent extraction, which technique Placer Dome suggests significantly reduces copper losses relative to many existing processes in which neutralization of the acid in the solution before solvent extraction is employed.

To achieve these results, Placer Dome teaches that the desired acid concentration ranges can be obtained when a sufficient amount of diluting solution is contacted with the copper-containing solution to yield the diluted copper-containing solution. Specifically, Placer Dome teaches that the ratio of the volume of copper-containing solution to the volume of diluting solution must range from about 1:10 to about 1:500. In this manner, the acid generated in pressure leaching is neutralized after, and preferably not before, solvent extraction and electrowinning.

While Placer Dome's patented process is usable in many situations, in cases where it is desirable to reduce operating costs and/or the metal-bearing ore at a particular site does not warrant such conditions, it would be desirable to obtain high metal recovery in processes where such dilution is not required.

SUMMARY OF THE INVENTION

While the way in which the present invention provides these advantages over the prior art is described in greater detail hereinbelow, in general, the process for recovering copper and other metal values from a metal-bearing material is improved, according to various aspects of the present invention, in that the pressure leach solution need not be significantly diluted before the copper and/or other metal values are recovered, for example, through solvent extraction, electrowinning, or other processes. In this manner, capital and operating costs can be reduced without sacrificing the extraction of copper or other metals.

Thus, in accordance with an exemplary embodiment of the present invention, a process for recovering copper from a copper-containing material generally includes the steps of: (i) providing a feed stream containing copper-containing material; (ii) pressure leaching the copper-containing feed stream to yield a copper-containing solution; and (iii) recovering cathode copper from the copper-containing solution using solvent extraction and electrowinning without significantly diluting the copper-containing solution. In general, recovery processes in accordance with the present invention yield high copper recovery, for example in excess of 98%, while at the same time yielding various other important benefits.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION

The present invention exhibits significant advancements over prior art processes, particularly with regard to metal recovery ratios and process cost advantages. Moreover, existing metal recovery processes that utilize a conventional atmospheric or pressure leaching/solvent extraction/electrowinning process sequence may, in many instances, be easily retrofitted to exploit the many commercial benefits the present invention provides.

Figure 1:
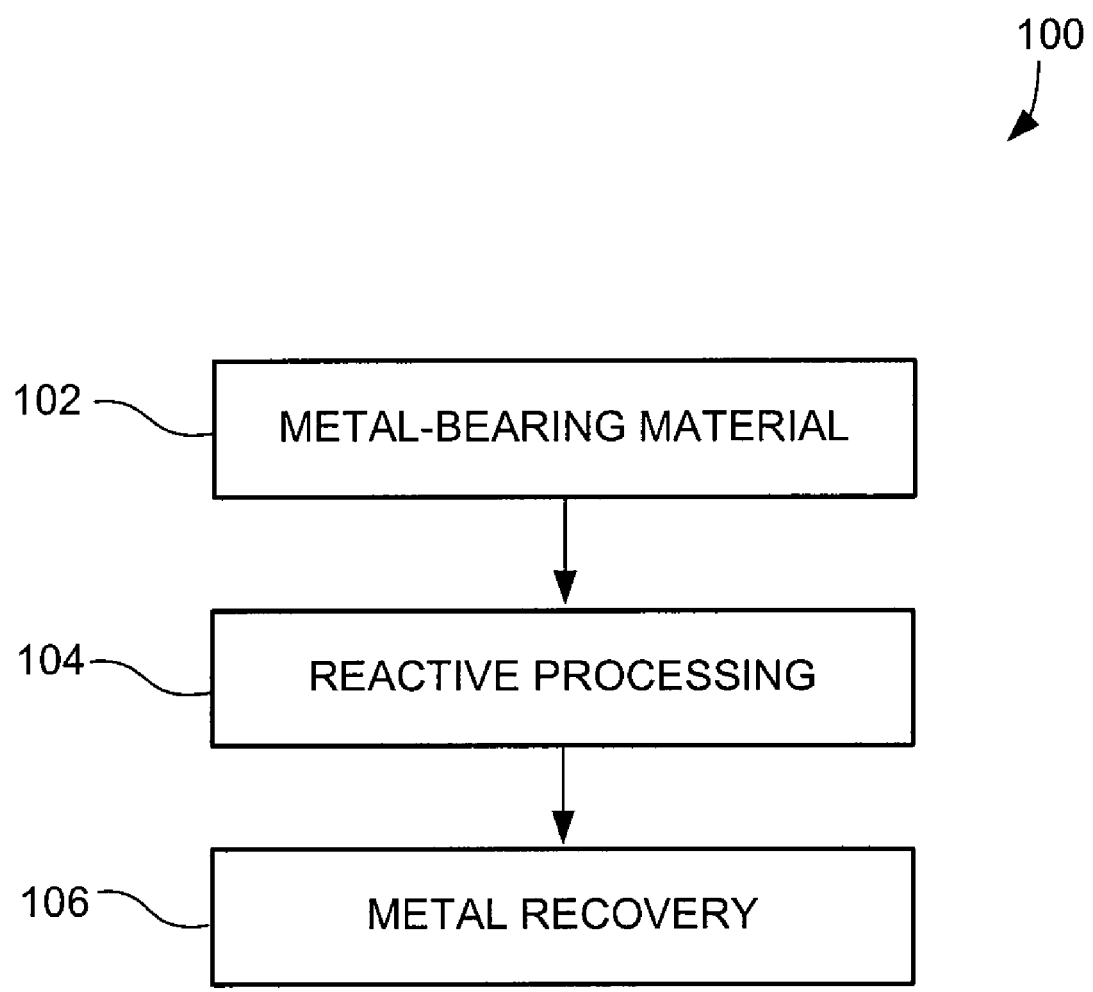
FIG. 1 illustrates a general flow diagram of a metal recovery process in accordance with one general embodiment of the present invention.

Referring to FIG. 1, in accordance with various aspects of the present invention, a metal-bearing material 102 is provided for processing in accordance with metal recovery process 100. Metal-bearing material 102 may be an ore, a concentrate, or any other material from which metal values may be recovered. Metal values such as, for example, copper, gold, silver, zinc, platinum group metals, nickel, cobalt, molybdenum, rhenium, uranium, rare earth metals, and the like may be recovered from metal-bearing materials in accordance with various embodiments of the present invention. Various aspects and embodiments of the present invention, however, prove especially advantageous in connection with the recovery of copper from copper sulfide concentrates and/or ores, such as, for example, chalcopyrite ($CuFeS_2$), chalcocite ($Cu_2S$), bornite ($Cu_5FeS_4$), and covellite ($CuS$). Thus, metal-bearing material 102 preferably is a copper ore or concentrate, and most preferably, is a copper sulfide ore or concentrate.

Metal-bearing material 102 may be prepared for metal recovery processing in any manner that enables the conditions of metal-bearing material 102—such as, for example, composition and component concentration—to be suitable for the chosen processing method, as such conditions may affect the overall effectiveness and efficiency of processing operations. Desired composition and component concentration parameters can be achieved through a variety of chemical and/or physical processing stages, the choice of which will depend upon the operating parameters of the chosen processing scheme, equipment cost and material specifications. For example, as discussed in some detail hereinbelow, metal-bearing material 102 may undergo comminution, flotation, blending, and/or slurry formation, as well as chemical and/or physical conditioning.

With continued reference to FIG. 1, after metal-bearing material 102 has been suitably prepared, metal-bearing material is subjected to reactive processing (step 104) to put a metal value or values in metal-bearing material 102 in a condition such that they may be subjected to later metal recovery steps, namely metal recovery step 106. For example, exemplary suitable processes include reactive processes that tend to liberate the desired metal value or values in the metal bearing material 102 from the metal-bearing material 102. In accordance with a preferred embodiment of the present invention, processing step 104 comprises pressure leaching, preferably, high temperature pressure leaching. As used herein, the term "pressure leaching" refers to a metal recovery process in which material is contacted with an acidic solution and oxygen under conditions of elevated temperature and pressure. In accordance with various aspects of the present invention, processing step 104 may comprise any type of pressure leaching process.

As previously briefly noted, pressure leaching processes are generally dependent upon, among other things, temperature, oxygen availability, and process chemistry. While various parameters for each may be utilized, in accordance with preferred aspects of the present invention, the temperature during pressure leaching preferably is maintained in the range of about 170° C. to about 235° C., most preferably in the range from about 200° C. to about 230° C., and optimally on the order of about 225° C.

To maintain the temperature in this desired range, a cooling liquid may be employed. As will be appreciated, pressure leaching of many metal sulfides tends to be an exothermic reaction, and the heat generated is generally more than that required to heat the feed slurry to the desired operating temperature. Excess heat may be removed and the desired operating temperature maintained by contacting cooling liquid with the feed slurry in the reactor vessel. The cooling liquid can be recycled liquid phase from the product slurry, neutralized raffinate solution, fresh make-up water, or mixtures thereof, or may be provided by any other suitable source. The amount of cooling liquid added during pressure leaching will vary according to the amount of sulfide minerals reacted (and thus the heat generated by the pressure leaching reaction).

The duration of pressure leaching in any particular application depends upon a number of factors, including, for example, the characteristics of the metal-containing material and the pressure leaching process pressure and temperature. Preferably, the duration of pressure leaching in accordance with various aspects of the present invention ranges from about less than 1 hour to about 3 hours, and optimally is on the order of about forty-five (45) to ninety (90) minutes. While any reactor vessel for pressure leaching may be used, preferably an agitated, multiple-compartment pressure leaching vessel is employed.

In accordance with various aspects of the present invention, processing step 104 via pressure leaching of metal-bearing material 104 produces a product slurry having a relatively high acid and metals content, and is characterized by high metal (e.g., copper) recoveries through metal recovery step 106. For example, no less than about 98% of the metal (e.g., copper) in the preferred chalcopyrite and other copper sulfides can generally be recovered through pressure oxidation utilizing the above-described conditions.

Contrary to prior art processes, such as for example the aforementioned Placer Dome processes, where significant amounts of diluting solution are combined with the pressure leaching liquor to reduce the acid concentration, in accordance with various aspects of the present invention, dilution is not used, or if used, relatively low dilution ratios are used. In cases where low dilution of the pressure leaching product slurry is employed, dilution ratios of less than about 1:10 metal containing solution to make-up solution are employed. Preferably, dilution is conducted such that the dilution ratio is on the order of between about 1:4 and about 1:8 of metal-containing solution to make-up solution.

With continued reference to FIG. 1, in accordance with various aspects of the present invention, metal recovery step 106 preferably comprises conventional solvent extraction and electrowinning (SX/EW). It should be appreciated, however, that other metal recovery processes may be used.

Where metal recovery step 106 comprises SX/EW, such processing preferably is conducted in a conventional manner. As such, suitable extraction reagents should be employed. Preferably, such extraction reagents include aldoxime, aldoxime/ketoxime mixtures and/or modified aldoximes. For example, particularly preferred solvent extraction reagents include LIX reagents, such as, for example, LIX 622N, which comprises a mixture of 5-dodecylsalicylaldoxime and tridecanol in a high flash point hydrocarbon diluent, available from Cognis Corporation; LIX 984, also available from Cognis Corporation, which is a mixture of 5-dodecylsalicylaldoxime and 2-hydroxy-5-nonylacetophenoneoxime in a high flash point hydrocarbon diluent; or M-5774, available from Avecia, an Acorga™ solvent extraction reagent, which comprises a modified aldoxime (5-nonyl salicylaldoxime). Other suitable solvent extraction reagents, however, may be employed.

As will be appreciated by the disclosure set forth herein, metal recovery process 100 enables various advantages over recovery processes wherein more significant dilution is required. For example, by using relatively low dilution ratios, lower operation costs potentially can be obtained, primarily due to the lower volume of fluids which need to be handled within metal recovery process 100.

Figure 2A:
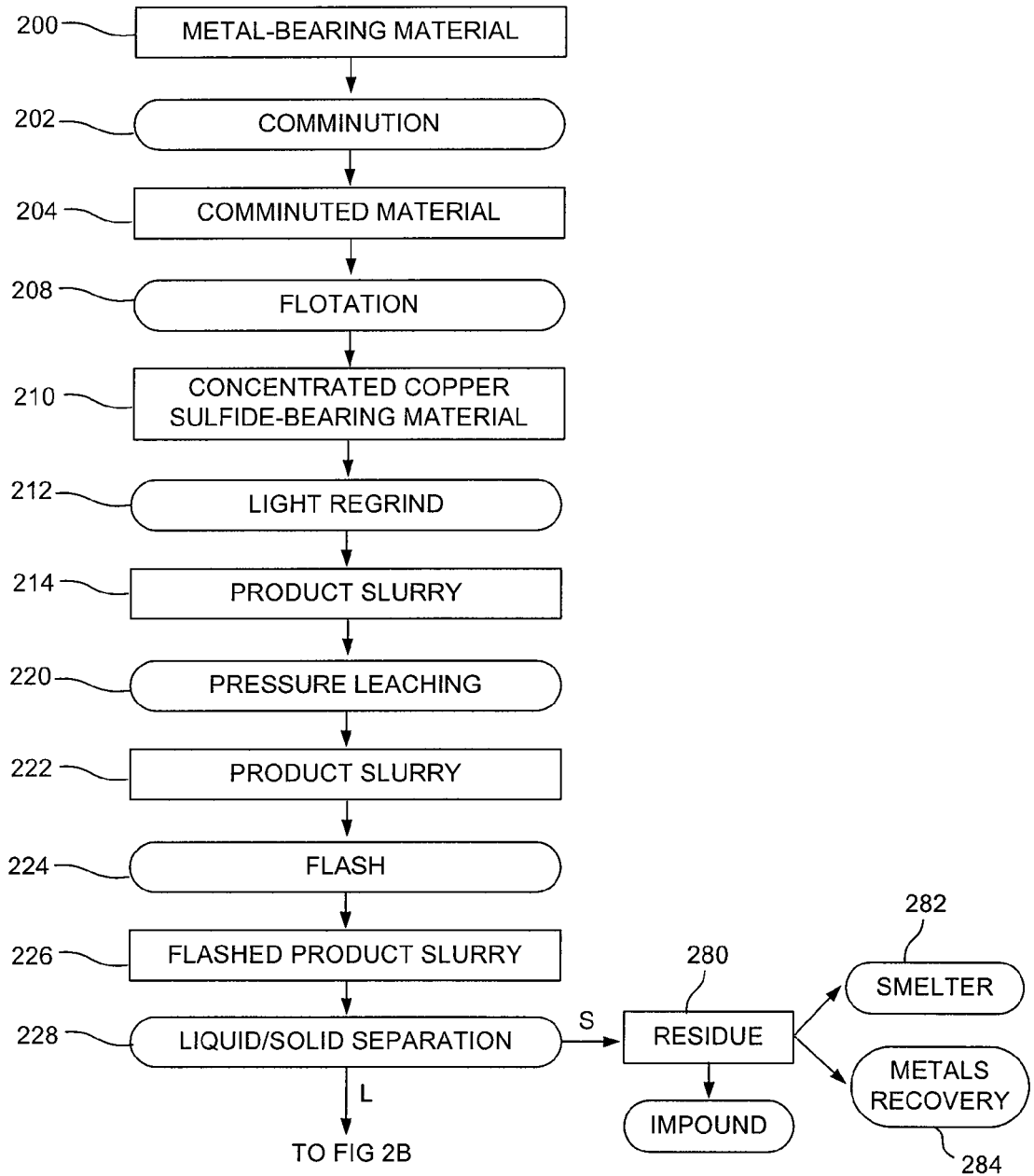
FIG. 2A illustrates a more detailed flow diagram of a metal recovery process in accordance with one exemplary embodiment of the present invention; and, FIG. 2B illustrates further aspects of the metal recovery process of FIG. 2A.
Figure 2B:
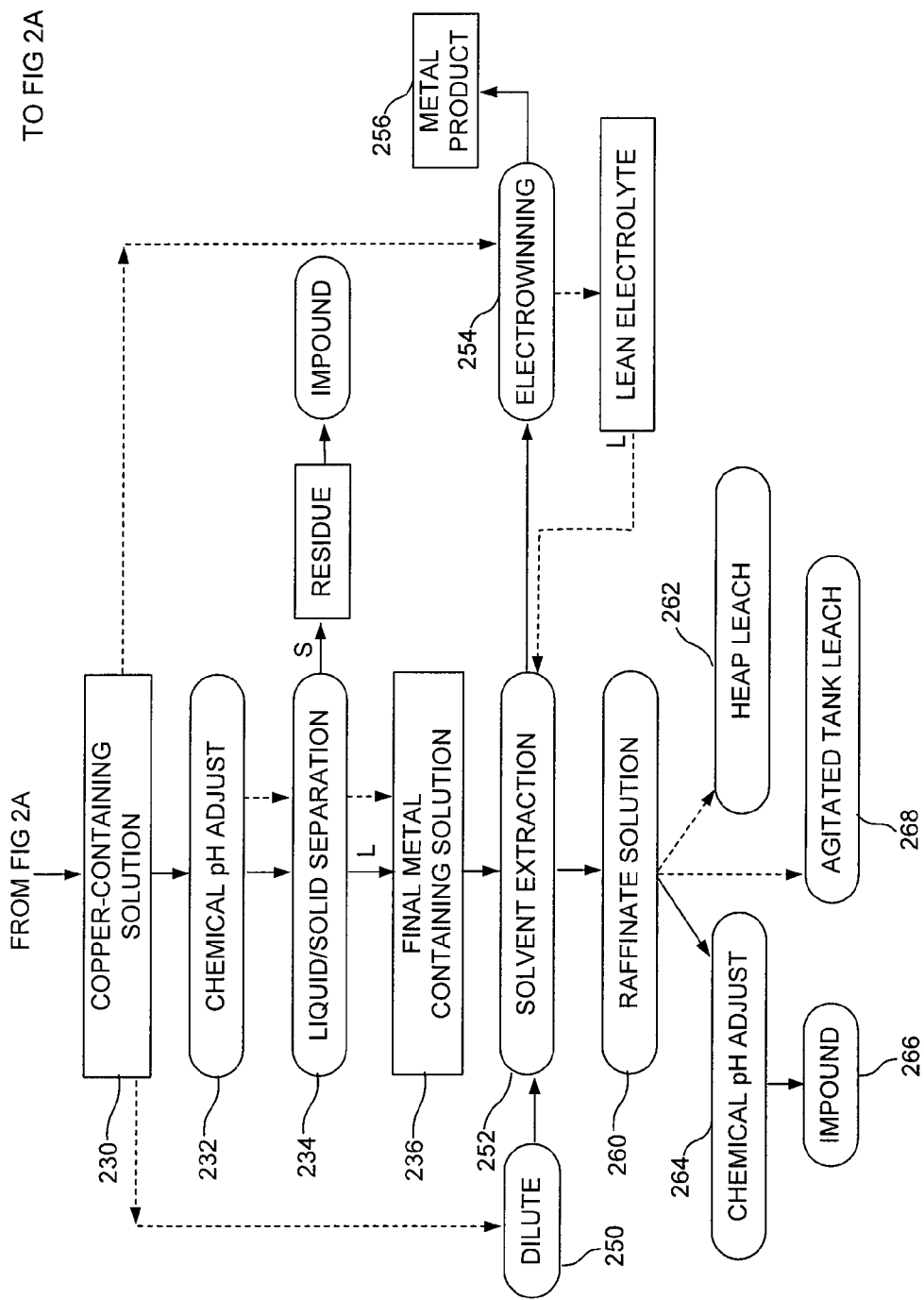

Referring now to FIGS. 2A and 2B, a further exemplary embodiment of the present invention is illustrated. In accordance with this embodiment, a metal-bearing material 200, preferably a copper-bearing material, is comminuted in step 202 to form a comminuted material 204. Preferably, metal-bearing material 200 comprises a copper sulfide-bearing material.

Preferably, comminuted material 204 is subjected to froth flotation (step 208) to separate copper sulfide-bearing materials from gangue minerals. The flotation concentrate, namely the concentrated copper sulfide-bearing material 210, is obtained and preferably contains copper and other metals.

Further comminution of concentrated copper sulfide-bearing material 210 may be necessary to yield a desired size distribution for pressure leaching. As will be appreciated, increasing the fineness of material 210 tends to increase the reaction rate during pressure leaching, and thus may permit the use of smaller, more economical pressure leaching apparatus. Accordingly, material 210 has a particle size of about 80% passing less than about 150 microns, more preferably less than about 100 microns, and optimally between about 30 to about 75 microns. In some instances, in order to achieve the optimal particle size, or to expose fresh surfaces or to break up lumps, a regrinding step 212 may be employed. During regrinding step 212, solution (e.g., feed slurry 206 or otherwise) may be added to the flotation concentrate 210 to facilitate the grinding process. A product slurry 214 is then formed, preferably with the addition of, for example, sulfuric acid, dispersants, and the like prior to high temperature pressure leaching (step 220). Preferably, product slurry 214 has less than about 50% solids by weight.

Product slurry 214 is next subjected to high temperature pressure leaching (step 220), preferably at a temperature in the range of about 210° C. to about 235° C. in a sealed, agitated, multi-compartment pressure leaching vessel with oxygen overpressure of at least about 70 psig for about 1-3 hours. During pressure leaching step 220, oxygen preferably is added continuously to the pressure leaching vessel to maintain the oxygen overpressure optimal for the desired chemical reactions to proceed That is, sufficient oxygen is suitably injected to preferably maintain an oxygen partial pressure in the pressure leaching vessel ranging from about 50 to about 300 psig, and more preferably in the range of about 60 to about 150 psig. The total pressure in the sealed pressure leaching vessel is superatmospheric, and can range from about 300 to about 750 psig, and is preferably in the range of about 400 to about 600 psig. A product slurry 222 is obtained in a conventional manner therefrom.

Product slurry 222 may be flashed (step 224) to release pressure and evaporatively cool product slurry 222 through release of steam to form a flashed product slurry 226. Flashed product slurry 226 preferably thereafter has a temperature ranging from about 85° C. to about 100° C. Solution recovered from steam generated from flashing step 224 may be cooled and used as process make-up solution (not shown).

In accordance with further aspects of this preferred embodiment, after product slurry 222 has been subjected to atmospheric flashing (step 224) using, for example, a flash tank, to achieve approximately ambient conditions of pressure and temperature, flashed product slurry 226 may be further conditioned in preparation for later metal-value recovery steps. In some cases, use of a heat exchanger may be advantageous to cool the slurry such that solid-liquid phase separation may take place. Preferably, one or more solid-liquid phase separation stages (step 228) may be used to separate solubilized metal solution from solid particles. This may be accomplished in any conventional manner, including use of filtration systems, counter-current decantation (CCD) circuits, thickeners, and the like. A variety of factors, such as the process material balance, environmental regulations, residue composition, economic considerations, and the like, may affect the decision whether to employ a CCD circuit, a thickener, a filter, or any other suitable device in a solid-liquid separation apparatus. However, it should be appreciated that any technique of conditioning flashed product slurry 226 for later metal value recovery is within the scope of the present invention. Preferably, flashed product slurry 226 is subjected to solid-liquid phase separation (step 228) to yield a resultant liquid phase copper-containing solution 230 and a solid phase residue 280.

Flashed product slurry 226 is suitably subjected to solid-liquid phase separation (step 228), by multiple stages of counter current decantation (CCD) washing in thickeners. Wash solution and a suitable flocculent may be added as desired during step 228. In accordance with one alternative aspect of this embodiment of the present invention, flashed product slurry 226 may be thickened in a primary thickener to recover approximately 95% or more of the soluble copper in a high grade pregnant leach solution. In this case, primary thickener underflow then proceeds to a multiple-stage CCD washing circuit, and wash solution and a suitable flocculent may be added as required (not illustrated).

Referring now to FIG. 2B, in order to optimize solution extraction of the copper, the pH of copper-containing solution 230 from solid-liquid phase separation step 228, in accordance with various aspects of this embodiment of the present invention, preferably is adjusted to a pH of about 1 to about 2.2, more preferably to a pH of about 1.2 to about 2.0, and still more preferably to a pH of about 1.4 to about 1.8. This adjustment may be accomplished in a variety of manners. In accordance with one aspect of the present invention, copper-containing solution 230 is subjected to a chemical pH adjustment step 232, which optionally can be followed by further solid-liquid separation (step 234) to yield a final metal-containing solution 236 for solvent extraction. In such case, the residue 238 from step 234 can be impounded (step 240) or otherwise disposed of.

Alternatively, or in combination with the method described above, the pH of copper-containing solution 230 may be adjusted through dilution (step 250). In contradistinction to the prior art methods that rely on significant dilution, in accordance with the present invention, when dilution is employed, low dilution ratios of make-up solution to copper-containing solution 230 are used. Dilution step 250 may be accomplished by dilution with process solution, fresh water or any other suitable liquid vehicle at dilution ratios of copper-bearing solution to make-up solution of less than about 1:10, and more preferably on the order of between about 1:4 to about 1:8. Once the pH of the copper-containing solution 230 has been appropriately adjusted, metal recovery preferably is achieved by solvent extraction (step 252), if necessary, using relatively high concentrations of extractants in the organic diluent, followed by electrowinning (step 254).

In accordance with the present invention, in some instances copper-containing solution may be directly electrowon. If the properties of solution 230 permit, electrowinning step 254 may be performed directly (that is, without first subjecting solution 230 to solvent extraction).

When appropriate, solvent extraction, in accordance with preferred aspects of this embodiment of the present invention, is conducted prior to electrowinning and is conducted in a generally conventional fashion. Typically, equilibrium conditions are selected such that the solvent extraction reagents collect the copper in copper-containing solution 230. The copper-bearing reagents are then subjected to more acidic conditions to shift the equilibrium conditions to cause the copper to be exchanged for the acid in a highly acidic acid stripping solution (not shown). Various process stages may be used, as necessary, to provide a suitable stream to feed the electrowinning process and to yield a substantially barren solvent for re-use in the extraction process. During solvent extraction 252, copper from copper-containing solution 230 may be loaded selectively onto an organic chelating agent, such as the aforementioned aldoximes or aldoxime/ketoxime blends. Preferably, an extraction reagent, such as LIX 984 or Acorga® M-5774, is dissolved in an organic diluent to result in the extraction of copper from metal-containing solution which can be recovered through conventional electrowinning (step 254) to yield the desired metal product 256. As previously mentioned, LIX 984 is a mixture of 5-dodecylsalicylaldoxime and 2-hydroxy-5-nonylacetophenone oxime in a high flash point hydrocarbon diluent, which forms complexes with various metal cations, such as $Cu^{2+}$. Other solvent extraction reagents may be used in accordance with various aspects of the present invention. Such extraction reagents should, however, be selected to facilitate suitable extraction and subsequent stripping operations.

Solvent extraction step 252 and electrowinning step 254 may also involve various solvent stripping and recycle operations (both of which are not shown) which can be operated in a conventional manner. Preferably, no less than about 98% of the copper in copper-containing solution 230 is recovered as cathode copper product 256 by solvent extraction 252 and electrowinning 254.

With continued reference to FIG. 2B, electrowinning step 254 also preferably proceeds in a conventional manner to yield a pure, cathode copper product 256. In accordance with the various aspects of this embodiment of the present invention, a high-quality, uniformly plated cathode copper product 256 may be realized without subjecting copper-containing solution 230 to significant dilution prior to solvent extraction. As those skilled in the art will appreciate, a variety of methods and apparatus are available for the electrowinning of copper and other metal values, any of which may be suitably used in accordance with this embodiment of the present invention.

Raffinate solution 260 from solvent-extraction step 252 may be used in a number of ways. For example, all or a portion of raffinate 260 may be used in heap leaching operations 262. In some cases, in accordance with various aspects of this embodiment of the present invention, use of raffinate 260 in heap leaching operations 262 may be desirable inasmuch as raffinate 260 may have higher acid levels and in some cases thereby more advantageously affecting heap leaching operations 262. Alternatively, the pH of raffinate solution 260 may be chemically adjusted, such as is shown in step 264 and the resulting product sent to impoundment (step 266). In accordance with yet another aspect of this embodiment of the present invention, raffinate solution 260 may be agitated in a tank leach operation (step 268).

With reference again to FIG. 2A, if the metal content of the washed solids, that is residue 280, from solid-liquid separation step 228 is sufficiently high to warrant further processing, the metals contained therein may be recovered through conventional means such as, for example, through smelting (step 282) or established precious metals recovery processing (step 284). If, however, the metals content of residue 280 is too low to justify further treatment, the residue may be sent to an impoundment area (step 286).

The present invention has been described above with reference to various exemplary embodiments. It should be appreciated that the particular embodiments shown and described herein are illustrative of the invention and not intended to limit in any way the scope of the invention as set forth in the appended claims. For example, although reference has been made throughout this disclosure primarily to copper recovery, it is intended that the invention also be applicable to the recovery of other metal values.

What is claimed is:

1. A metal recovery process comprising the steps of:
   a) providing a metal-bearing material in a slurry form;
   b) subjecting said slurry to flotation to form a concentrated metal-bearing material;
   c) pressure leaching said concentrated metal-bearing material at a temperature in the range of about 170° C. to about 235° C. in an oxygen-containing atmosphere in a pressure leaching vessel to form a product slurry;
   d) separating said product slurry into a metal-bearing solution and a solids-containing residue;
   e) adjusting the pH of said metal-bearing solution to a pH of less than about 2.2 by combining said metal-bearing solution with a make-up diluting solution to yield a pH-adjusted metal-bearing solution, wherein the ratio of said metal-bearing solution to said make-up diluting solution is in the range of from about 1:4 to about 1:8;
   f) solvent extracting and electrowinning said pH-adjusted metal-bearing solution to yield an acid-containing raffinate solution;
   g) applying said acid-containing raffinate solution in a heap leaching operation.

2. The process of claim 1 wherein said step of providing a metal-bearing material comprises providing a copper containing material.

3. The process of claim 2 wherein said step of solvent extracting and electrowinning comprises solvent extracting and electrowinning said pH-adjusted copper containing solution to yield an acid containing raffinate solution and copper cathode.

4. The process of claim 3, wherein said step of adjusting the pH of said metal-bearing solution comprises combining said metal-bearing solution with a make-up diluting solution to yield a pH-adjusted metal-bearing solution wherein the ratio of said metal-bearing solution to said make-up diluting solution is in the range of from about 1:4 to about 1:8 and the pH of said pH-adjusted metal-bearing solution is from about 1.4 to about 1.8.

* * * * *